United States Patent [19]

Kitagawa et al.

[11] Patent Number: 5,038,875

[45] Date of Patent: Aug. 13, 1991

[54] WATERPROOF AUTOMATIC WEIGHING APPARATUS

[75] Inventors: Kazumi Kitagawa, Shiga; Satoshi Konishi, Kusatsu; Naoki Takahashi, Kyoto; Masahiko Tatsuoka, Shiga, all of Japan

[73] Assignee: Ishida Scales Mfg. Co. Ltd., Kyoto, Japan

[21] Appl. No.: 547,587

[22] Filed: Jul. 3, 1990

Related U.S. Application Data

[63] Continuation of Ser. No. 400,511, Aug. 30, 1989, abandoned.

[30] Foreign Application Priority Data

Sep. 7, 1988 [JP] Japan .................... 63-222528[U]
Sep. 14, 1988 [JP] Japan .................... 63-119754

[51] Int. Cl.$^5$ .................. G01G 13/16; G01G 21/28
[52] U.S. Cl. ................... 177/25.18; 177/180
[58] Field of Search ................. 177/25.18, 180

[56] References Cited

U.S. PATENT DOCUMENTS

| 4,398,612 | 8/1983 | Mikami et al. | 177/25.18 |
| 4,662,462 | 5/1987 | Kitagawa et al. | 177/25.18 |
| 4,683,966 | 8/1987 | Nakagawa et al. | 177/25.18 |

FOREIGN PATENT DOCUMENTS 59-11816 1/1984 Japan .
61-160111 3/1986 Japan .
62-36097 9/1987 Japan .
63-282615 11/1988 Japan .

Primary Examiner—George H. Miller, Jr.
Attorney, Agent, or Firm—Felfe & Lynch

[57] ABSTRACT

A waterproof automatic weighing apparatus comprising a case hermetically sealed by means of sealing members, internal components lodged in this case, and external components arranged outside this case. The internal components include weight sensing elements, driving sections for opening and closing hopper gates, electromagnetic vibrator sections, and a control unit having an electrical circuit. The external components include a dispersion table, feed troughs, pool hoppers, weighing hoppers, and, as needed memory hoppers. Each of the internal components is hermetically connected to the corresponding external component.

5 Claims, 5 Drawing Sheets

WATERPROOF AUTOMATIC WEIGHING APPARATUS

This is a continuation application of application Ser. No. 400,511, filed Aug. 30, 1989 now abandoned.

BACKGROUND OF THE INVENTION

1. Field of the Invention

This invention relates to a waterproof automatic weighing apparatus having electrical equipment such as weight sensing elements consisting of load cells or the like, driving sections for opening and closing hopper gates, electromagnetic vibrator sections, and a control unit for controlling the entire apparatus.

2. Description of the Related Art

In an automatic weighing apparatus of this type, some of the components including the dispersion table, the feed troughs, the pool hoppers, the weighing hoppers, the memory hoppers (used as needed) etc. are situated externally due to their necessary attributes, whereas the other components such as the weight sensing elements, the driving sections for opening and closing hopper gates, the electromagnetic vibrator sections, and the control unit having an electrical circuit section are situated internally. In the following, the former group of components will be referred to as external components, and the latter group as internal components.

In an automatic weighing apparatus of this type, articles are fed to the external components, where the cycle of weighing and discharging is repeated. A single automatic weighing apparatus is not always used to weigh one kind of article, but may often be used to weigh different kinds of article, as needed. As a result, it may happen that the remnant of one kind of article is mixed with another kind of article. This is undesirable from the hygienic point of view and also can even cause deterioration in the value of the articles weighed. Even when it is used to weigh only one kind of article, the apparatus is not free from the problem mentioned above since powder, scraps and seasoning such as salt from the articles being weighed will adhere to the external components, which is not only unhygienic but may lead to weighing errors.

Conventionally, these problems have been coped with by washing, whenever necessary, the external components after removing them from the apparatus body, eliminating, at the same time, the above-mentioned adhering matter accumulated on the body. This operation is quite inefficient.

In order to eliminate this inconvenience, various attempts have been made to develop weighing apparatuses which can be washed without removing the external components therefrom. Examples of such apparatuses are proposed in Japanese Utility Model Laid-Open Nos. 59-11816 and 61-160111 as well as Japanese Patent Laid-Open No. 63-282615. These apparatuses are based on an idea according to which internal components are protected by a cover so as to prevent any undesirable effect on them during the washing of the external components. However, what is protected by a cover in these apparatuses is only the electromagnetic vibrator sections, no covering being provided for the other important internal components. Thus, during the washing of the external components, many internal components are left subject to the adhesion of scraps of the articles scattered by washing fluid such as water and air, so that many internal components suffer damage and rust, resulting in deterioration in weighing accuracy and defective operation.

SUMMARY OF THE INVENTION

This invention aims at eliminating the above-mentioned problems experienced with conventional automatic weighing apparatuses. It is accordingly an object of this invention to provide an automatic weighing apparatus which does not suffer damage or rust due to washing liquid, adhering scraps of articles or the like, and, consequently, which is capable of maintaining high weighing accuracy and operating in a satisfactory manner over a long period.

In order to attain the above object, this invention provides a waterproof automatic weighing apparatus comprising: external components which are situated externally because of their necessary attributes, internal components which are situated internally because of their necessary attributes, and a case hermetically sealed by means of sealing members, the above-mentioned external components being arranged outside the above-mentioned case, the above-mentioned internal components being arranged inside the above-mentioned case, the above-mentioned external and internal components being connected to each other in a water-tight manner.

An automatic weighing apparatus having the above-mentioned construction allows its external components to be washed without being removed therefrom, the washing being effected without allowing the washing fluid or scraps of articles to enter the internal components arranged in the case. If necessary, the operator can remove the external components from the case without touching the internal components at all. In either case, the internal components are hermetically sealed in the case, so that damage and rust generation attributable to the washing liquid, the adhesion of scraps of goods or an inadvertent touching of the operator can be avoided.

Another object of this invention is to provide an automatic weighing apparatus which allows a case hermetically sealing the internal components to be composed with ease.

This object can be achieved with a form of this invention in which the case is built by connection together three covering plates: an upper covering plate, a side covering plate, and a lower covering plate.

Still another object of this inventions is to provide an automatic weighing apparatus whose memory hoppers and the driving sections for opening and closing their gates can, if not required, be removed from the case, retaining its hermetic sealing even when these components are thus removed.

This object can be achieved with a form of this invention in which the memory hoppers and the driving sections for opening and closing their gates are detachably mounted on the case, the holes for mounting these driving sections on the case being closed with a cover plate member when they are removed.

DETAILED DESCRIPTION OF THE PREFERRED EMBODIMENTS

Figure 1:
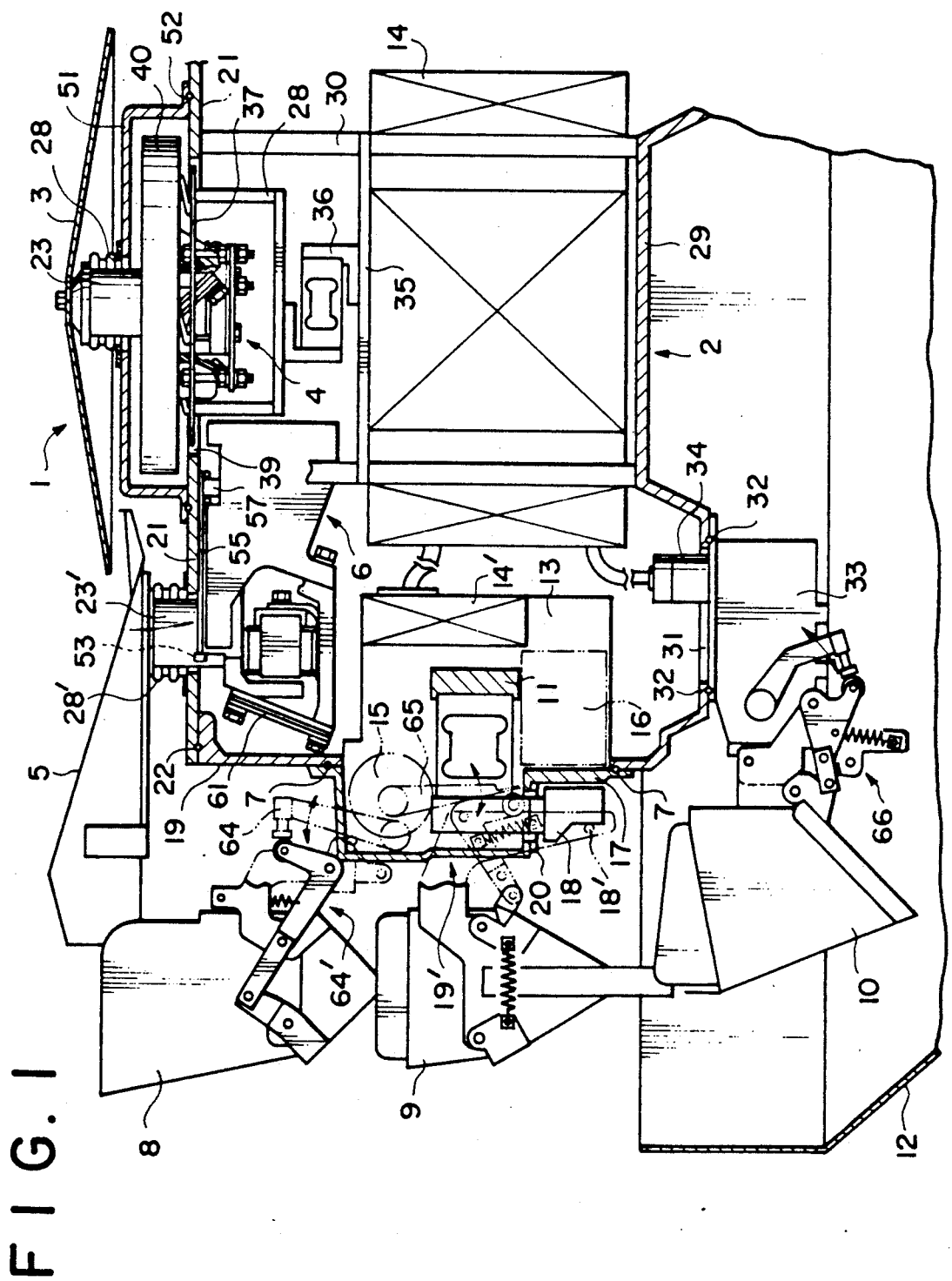
FIG. 1 is a longitudinal sectional front view showing substantially the left-hand half of a waterproof automatic weighing apparatus in accordance with a first embodiment of this invention.

Referring to FIG. 1, the reference numeral 1 indicates an automatic weighing apparatus which includes a case 2 constituting a part of the apparatus and composed of an upper cover plate 21, a lower cover plate 29, and a side cover plate 19' consisting of a lower side plate 17 and an upper side plate 19. These plates will be described below. The reference numeral 3 indicates a dispersion table adapted to make a spiral reciprocating movement by means of a spiral-reciprocation vibrator section 4 described below. The reference numeral 5 indicates feed troughs each of which is adapted to vibrate in a direction perpendicular to an associated spring 61 by means of an associated electromagnetic vibrator section 6 described below, thereby transferring articles to be weighed to pool hoppers 8.

The weighing apparatus shown further includes weighing hoppers 9 and memory hoppers 10 of which the latter may be omitted if so desired. In the case where no memory hoppers 10 are provided, articles to be weighed are first fed to the dispersion table 3, and are transferred therefrom through the feed troughs 5 and the pool hoppers 8 to the weighing hoppers 9, where they are weighed by means of weight sensing elements 11 such as load cells. Arithmetic operations for combinations are then performed on the basis of the values of weight obtained. The weighed articles in weighing hoppers 9 which are selected for these arithmetic operations for combinations are discharged to a collecting chute 12, and undergo the subsequent process such as packing. When memory hoppers 10 are provided, the arithmetic operations for combinations are performed on the basis of the values of weight obtained by means of the weighing hoppers 9 and the memory hoppers 10. Such arithmetic operations for combinations are well known in the art. In the case where the arithmetic operations for combinations are performed on the basis of the values of weight obtained by means of the weighing hoppers 9 only, a discharge signal is output when the weighed articles in weighing hoppers 9 selected for the arithmetic operations for combinations are discharged. In response to this discharge signal, articles to be weighed are fed from the associated pool hoppers 8 to these weighing hoppers 9, respectively. Alternatively, the arithmetic operations for combinations may be performed on the basis of the values of weight obtained by means of the weighing hoppers 9 and the memory hoppers 10. In that case, articles which have been weighed are transferred from the relevant weighing hoppers 9 to the associated memory hoppers 10 in response to the discharge signal for the memory hoppers 10 or the weighing hoppers 9. Subsequently, articles to be weighed are fed, in response to this discharge signal, from the associated pool hoppers 8 to the relevant weighing hoppers 9. Further, in response to this signal, the associated feed trough 5 vibrates in cooperation with the dispersion table for a predetermined period of time, thereby feeding these pool hoppers 8 with articles to be weighed. These operations are also conventionally well known.

The reference numeral 13 indicates driving sections for opening and closing hoppers. Each of these driving sections 13 includes a driving circuit board 14', a weight sensing element 11, and electric motors 15 and 16. The reference numeral 17 indicates a lower side plate which entirely covers the driving sections 13. One end of each weight sensing element 11 is fixed to the associated driving section 13, and the other end thereof is mounted on a hopper support 18 arranged inside the lower side plate 17 and protruding downwards therefrom. Pins (not shown) stick out from both sides of the hopper support 18. The associated weighing hopper 9 is detachably engaged with these pins, the weighing hopper 9 being prevented from swinging to the right (as seen in FIG. 1) by means of a pin 18' provided on the hopper support 18.

The lower and upper side plates 17 and 19 form the side covering plate 19'. They are hermetically connected with each other through a sealing member 7 such as a packing. The hopper supports 18 protruding from the lower section of the lower side plate 17 as well as the section around the lower side plate 17 are hermetically sealed by means of a diaphragm 20. The upper covering plate 21 and the side covering plate 19' are hermetically connected with each other through a sealing member 22 such as a packing. Short cylindrical stays 23 and 23' of electromagnetic vibrator sections 4 and 6 described below protrude from the upper covering plate 21. These short cylindrical stays 23 and 23' are hermetically covered with flexible bellows 28 and 28', respectively. The reference numeral 14 indicates a control-unit circuit for controlling the entire apparatus. It serves to control the arithmetic operations for combinations on the basis of the measurement values obtained by means of the weighing hoppers and the stored measurement values from the memory hoppers 10, the opening and closing of hoppers, the vibration of the electromagnetic vibrator sections 4 and 6, etc. The reference numeral 29 indicates a lower covering plate, which is hermetically connected with the side covering plate 19' through a sealing member 7 such as a packing. The lower and upper covering plates 29 and 21 are connected with each other through, for example, four posts 30.

While the memory hopper 10 shown is one of an automatic combination weighing apparatus of the single-memory type, there is no difference in structure if those of an apparatus of the double-memory type are employed, so that, when installing such memory hoppers 10, mounting holes 31 are provided in the lower covering plate 29. Driving sections 33 for the memory hoppers 10 are hermetically mounted on the case by means of these mounting holes through sealing members 32 such as packings. These driving sections 33 are connected to a driving-unit circuit 14 to perform arithmetic operations for combinations, and to control the opening and closing of the memory hoppers selected through the arithmetic operations. The driving-unit circuit 14 is connected to the driving sections 33 through cables which connected to respective connectors 34, the length of the cables being such that the detachment and attachment of the memory hoppers is not hindered. In the case where no memory hoppers 10 are used, the driving sections 33 for the memory hoppers are removed, the mounting holes 31 for them being hermetically sealed by a plate member through sealing members such as packings.

Figure 2:
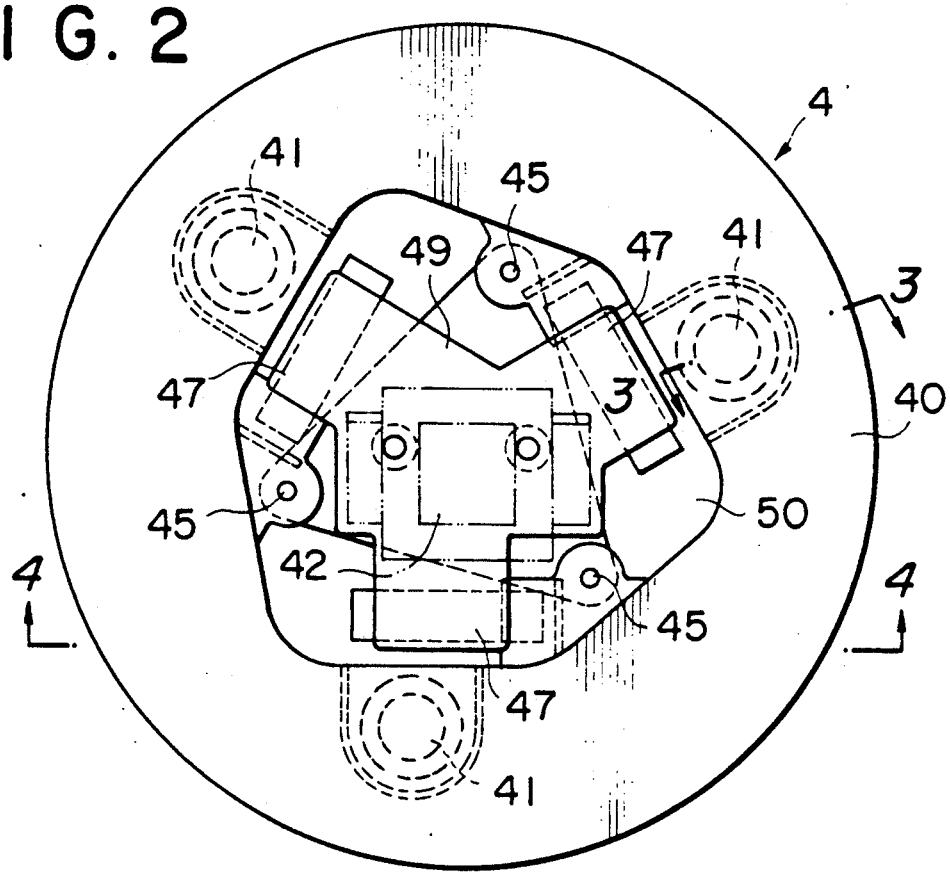
FIG. 2 is a plan view of the section performing a spiral reciprocating vibratory motion of the dispersion table in the embodiment shown in FIG. 1.
Figure 3:
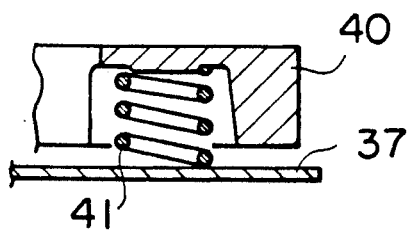
FIG. 3 is a sectional view taken along the line 3—3 of FIG. 2 and seen in the direction of the arrows.
Figure 4:
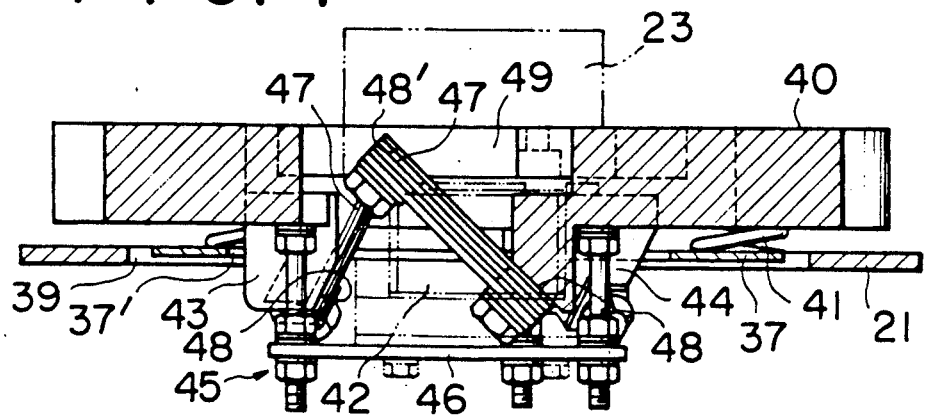
FIG. 4 is a sectional view taken along the line 4—4 of FIG. 2 and seen in the direction of the arrows.

FIGS. 2, 3 and 4 show in detail the spiral-reciprocation-vibrator section 4 of the dispersion table 3. Such vibrator section is disclosed in U.S. Pat. No. 4,398,612 and Japanese Utility Model Publication No. 62-36097, and is well known in the art. A summary description thereof will be given here.

Referring first to FIG. 1, a weight sensing element 36 is provided on a horizontal plate 35 arranged horizontally and fixed in the middle of the posts 30, the weight sensing element 36 supporting and fixing a support member 37 through a connecting member 38. A through-hole 39 provided in the upper covering plate 21 receives the support member 37, which is connected with a base member 40 through a plurality of springs 41 (see FIGS. 2 to 4). The lower part of the spiral-reciprocation-vibrator section 4 extends through a through-hole 37' provided in the support member 37 (see FIG. 4), with a clearance therebetween. The base member 40 includes a protruding section 43 extending downwards therefrom. A horizontal plate 46 is fixed thereto by means of bolts and nuts 45 which are attached to the base member 40 along grooves 44 provided in the protruding section 43. An electromagnetic vibrator 42 is mounted on this horizontal plate 46. Plate springs 47 are fixed to the inclined surfaces 48 of the protruding section 43 of the base member 40 as well as to the inclined surface 48' of a vibrating member 49 which is fixed to the lower end of the short cylindrical stay 23. This stay extends through a stay-protrusion hole 50 provided in the base member 40. Detachably mounted on the upper end of this short cylindrical stay 23 is the dispersion table 3 (see FIG. 1). A cover 51 is hermetically connected with the upper covering plate 21 through a sealing member 52 such as a packing in such a manner as to cover the base member 40. A flexible bellows 28 is provided on the cover 51 and is hermetically connected with the short cylindrical stay 23, following the movement thereof. The weight sensing element detects any excess or shortage of articles to be measured which are fed to the dispersion table 3; the detection is effected on the basis of the weight of articles to be measured. When there is a shortage of articles to be measured, additional articles to be measured are fed to the dispersion table 3 by driving, for example, a bucket conveyor (not shown).

Figure 5:
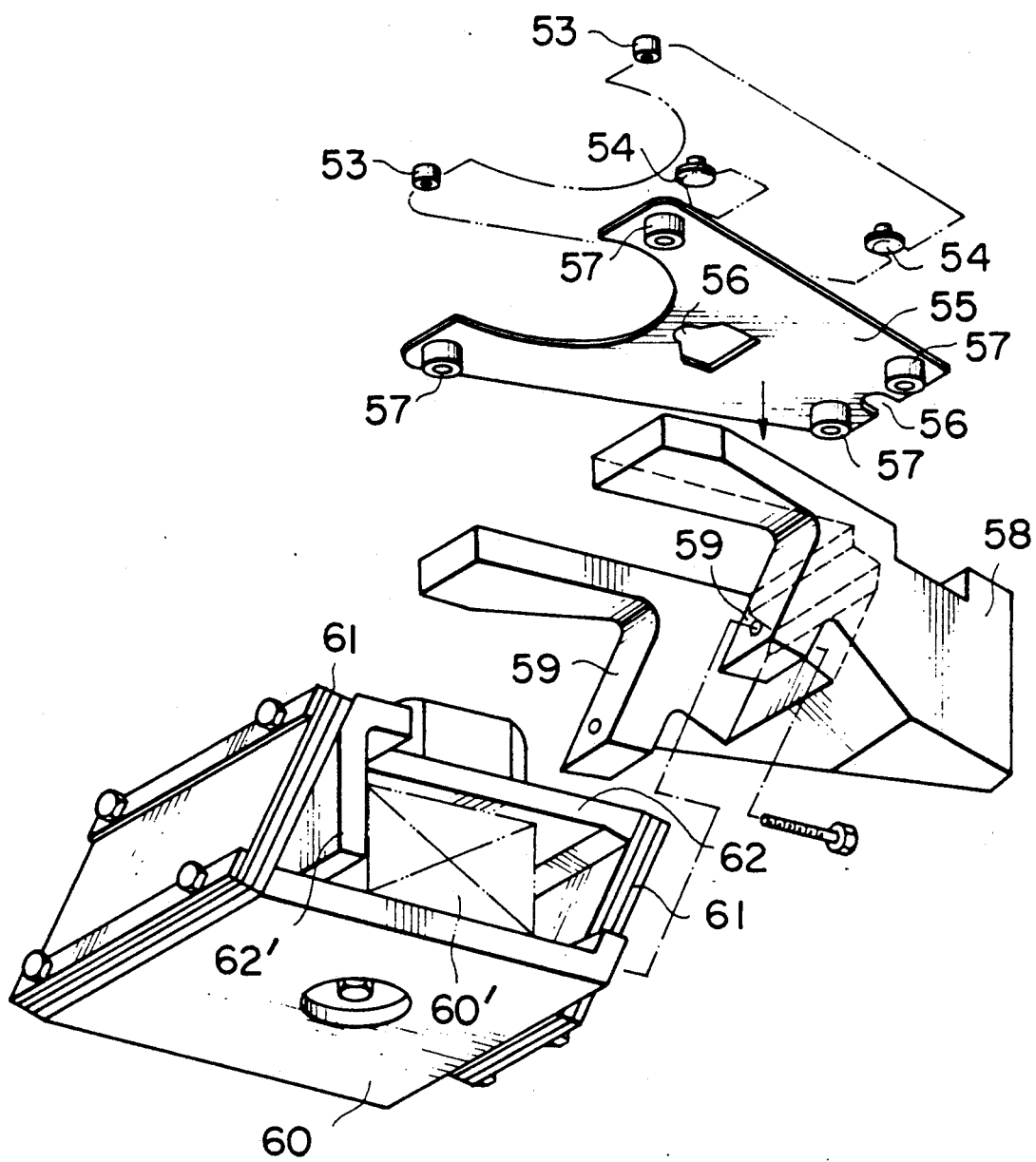
FIG. 5 is an exploded perspective view of the electromagnetic vibrator section of a feed trough used in the embodiment shown in FIG. 1.
Figure 6:
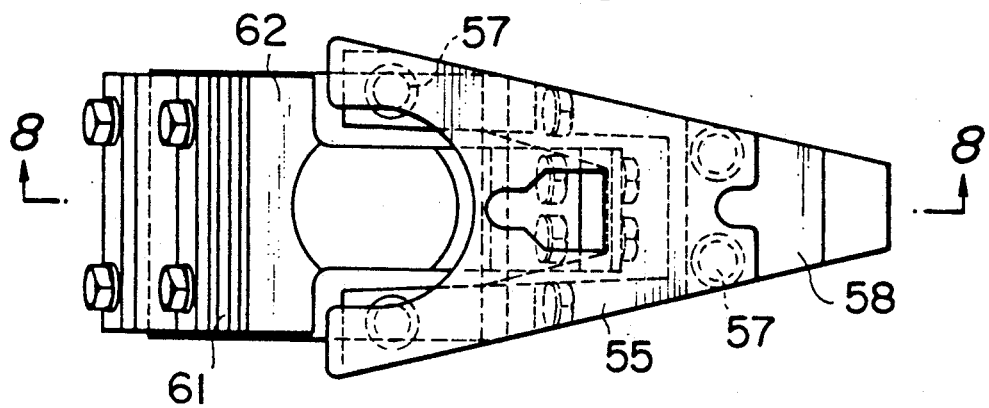
FIG. 6 is a plan view of the section shown in FIG. 5 when assembled.
Figure 7:
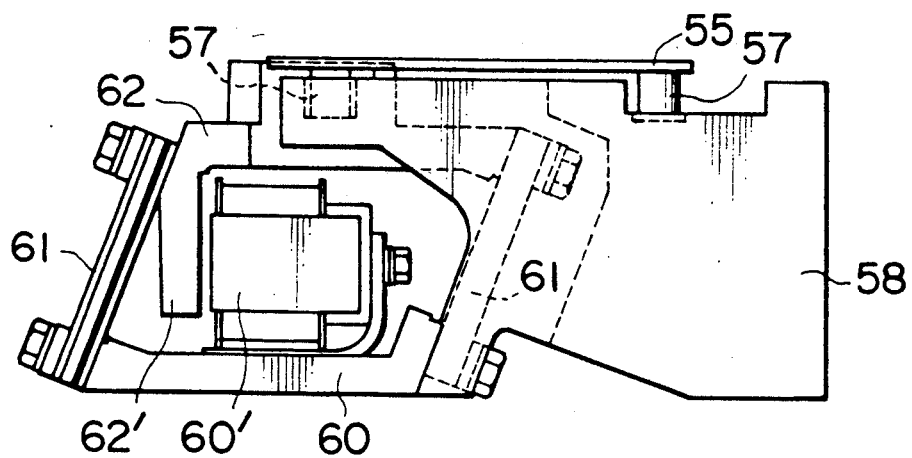
FIG. 7 is a front view of the same.
Figure 8:
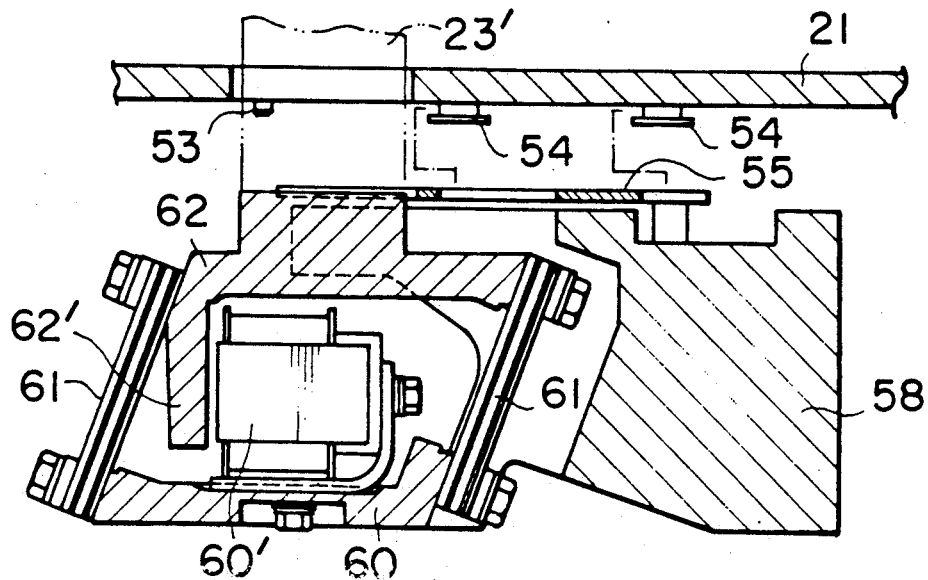
FIG. 8 is a sectional view of a part of the section shown in FIG. 6, taken along the line 8—8 and seen in the direction of the arrows.

Next, the electromagnetic vibrator sections 6 for the feed troughs 5 will be described with reference to FIGS. 5 to 8. Provided on the upper covering plate 21 are lock pins 53 which having respective springs and capable of coming in and out of the upper covering plate 12 as desired, as well as hanger pins 54 (FIGS. 5 and 8). In each of the electromagnetic vibrator sections 6, a hanger plate 55 is provided which is locked by means of the associated hanger pins 54. This is effected by forcing the associated lock pins 53 into the upper covering plate 21 against the resilient force of their springs and transversely moving the hanger plate 55 to allow the hanger pin 54 to be locked in lock holes 56 provided in the hanger plate 55 (FIG. 5). Then, the lock pins 53 allowed to project from the upper covering plate 21 due to the resilient action of their springs and are engaged with the rear ends of the branch sections of the hanger plate 55. Attached to the four corners of the hanger plate 55 are sealing members 57 such as rubber bushes, the hanger plate 55 being fixed to a support member 58 by means of screws or the like extending through the holes in the sealing members 57. The support member 58, having a fork-like configuration, includes legs 59 to which a feeder base 60 is fixed by means of screws. An electromagnetic vibrator 60' is provided in this feeder base 60. Inclined plate springs 61 are provided on this feeder base 60. The respective lower ends of these inclined plate spring 61 are fixed to the feeder base 60 by means of screws, and the respective upper ends thereof are fixed to a vibrating member 62 by means of screws. The vibrating member 62 has a tongue-like end 62' which faces the electromagnetic vibrator 60'. Fixed to the upper section of the vibrating member 62 is the lower end of the associated short cylindrical stay 23', the upper end of which is supported by the associated feed trough 5. The lower end of the associated flexible bellows 28' is hermetically attached to the upper covering plate 21 (FIG. 1), the flexible bellows 28' being in hermetic contact with the covering plate 21 in such a manner that it can move upwards along the short cylindrical stay 23' to follow the movement thereof.

The mechanism allowing the hoppers to be attached to and detached from the apparatus body is described in detail in U.S. Pat. No. 4,662,462. A summary description thereof will be given here. Referring to FIG. 1, the motor 16 causes a lever 64 to swing as indicated by the dotted arrow, thereby driving the link mechanism 64' of the associated pool hopper 8 and opening and closing the gate of this pool hopper 8. The motor 15 causes its lever 65 to swing as indicated by the dotted arrow, thereby selectively opening and closing the double-hinged gate of the associated weighing hopper 9. Both the levers 64 and 65 are operatively linked with the shafts of the motors 15 and 16 protruding in a sealed state on the external side of the front cover 17. The opening and closing of the associated memory hopper 10 is effected by a motor which is provided in the corresponding driving section 33. The shaft of this motor protrudes in a sealed state out of the case of the driving section 33. This motor drives a link mechanism 66, thereby opening and closing the gate of this memory hopper 10. Thus, the hoppers can be attached to and detached from the apparatus body as desired.

Figure 9:
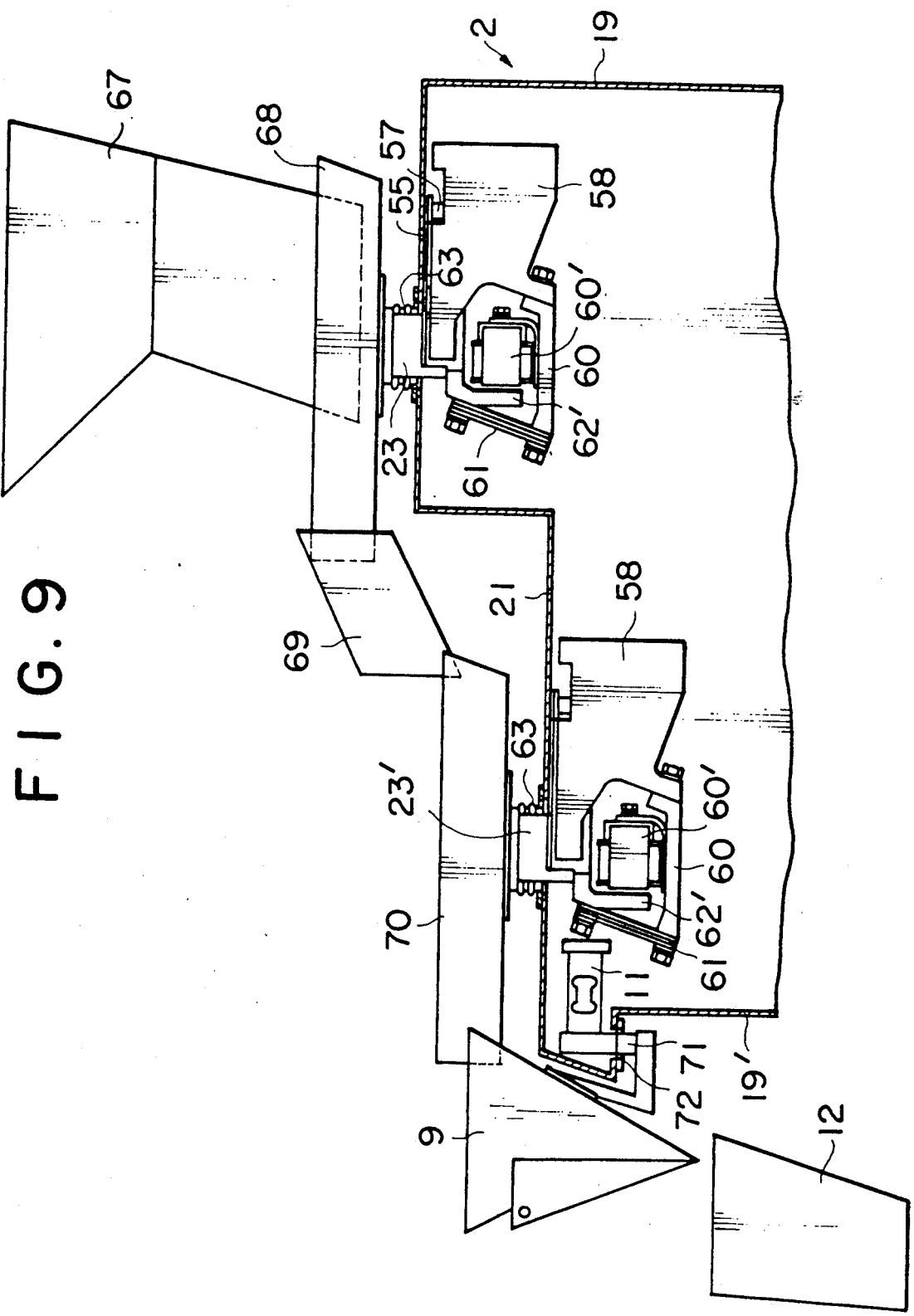
FIG. 9 is a sectional view, similar to FIG. 1, showing a waterproof automatic weighing apparatus in accordance with a second embodiment of this invention.

Next, a horizontal-type automatic weighing apparatus, which constitutes the second embodiment of this invention, will be described with reference to FIG. 9. In the following, those components which are identical to these of the first embodiment will be referred to by the same reference numerals, the description of such components being omitted. The right-hand one (as seen in FIG. 9) of the plate springs 61 is hidden behind the fork-like support member 58. The reference numeral 67 indicates a feed hopper from which articles to be weighed are transferred to a first vibrating feeder 68. With the vibration of this feeder 68, the articles are transferred to an adjusting chute 69, and are further transferred to a second vibrating feeder 70. As this second vibrating feeder 70 vibrates, the articles to be weighed are fed to the weighing hopper 9, where they are measured by means of a weight sensing element 11. Then, they are transferred to a chute 12. While the gate of the weighing hopper 9 shown is of the single-swing type, it can naturally be of the double-hinged type. This horizontal-type automatic weighing apparatus includes a case 2 which is composed of an upper covering plate 21, a side covering plate 19', and a lower covering plate 5 (not shown).

One end of the weight sensing element 11 is fixed to the case 2, and the other end thereof is connected to a connecting member 71, which is hermetically attached to the case 2 through a sealing member 72 such as a rubber plate. Apart from this weight sensing element 11, the apparatus further includes electromagnetic vibrator sections, driving sections 13 for opening and closing hopper gates, a control-unit circuit 14, a driving circuit board 14', etc. which are also lodged in the case 2, as in the first embodiment.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A combined weighing apparatus comprising:
   means for dispersing articles being weighed supplied at a central upper part of the apparatus in a plurality of transfer passages arranged radially from a center to outside of the apparatus;
   means for weighing said dispersed articles by a weighing equipment attached to each transfer passage and for transferring the dispersed articles to a lower part of each transfer passage;
   means for combining the resultant weighed values to obtain a combination of weighed value from which a fixed weight is obtained;
   means for collecting each article constituting said combination from each transfer passage to one place;
   said apparatus comprising a plurality of external components constituting the transfer passages for the articles including a portion of said dispersing, weighing and transferring means, and said collecting means;
   a plurality of internal components including operating elements for operating said external components to disperse, transfer, and weigh the articles and including electrical equipment including said means for combining weighed values; and
   a case, said internal components except operating elements arranged outside said case being accommodated within said case in a water-tight manner, said case being arranged radially inside said external components in the manner of surrounding said internal components and being constructed to be waterproof and prevent the entry of scraps to inside of the apparatus.

2. An automatic weighing apparatus as claimed in claim 1, wherein said case is formed by unifying an upper covering plate, a side covering plate, and a lower covering plate.

3. An automatic weighing apparatus as claimed in claim 1, wherein said external components include a dispersion table, feed troughs, pool hoppers, weighing hoppers, and, as needed, memory hoppers, said internal components including weight sensing elements, driving sections for opening and closing hopper gates, electromagnetic vibrator sections, and a control unit having an electrical circuit section.

4. An automatic weighing apparatus as claimed in claim 3, wherein said memory hoppers and the driving sections for opening and closing their gates are detachably mounted on said case, mounting holes which are provided in said case with a view to allowing the driving sections for opening and closing said hopper gates to be attached being closed by means of a cover plate member after said driving sections have been removed from the apparatus body.

5. An automatic weighing apparatus comprising:
   means for dispersing articles being weighed and for supplying said articles to a transfer passage arranged at an upper part of the apparatus;
   means for weighing said dispersed articles by a weighing equipment attached to said transfer passage and for transferring the dispersed articles to a lower part of the transfer passage; and
   means for discharging said weighed articles form the lower part of the apparatus;
   the apparatus comprising a plurality of external components constituting the transfer passage for the articles including a portion of said dispersing, weighing and transferring means, and said discharging means;
   a plurality of internal components including operating elements for operating said external components to disperse, transfer and weigh the articles and including electrical equipment; and
   a case, said internal components except operating elements arranged outside said case being accommodated within said case in a water-tight manner, said case being arranged inside said external components in the manner of surrounding said internal components and being constructed to be waterproof and prevent the entry of scraps to inside of the apparatus.

* * * * *

UNITED STATES PATENT AND TRADEMARK OFFICE
CERTIFICATE OF CORRECTION

PATENT NO. : 5,038,875

DATED : August 13, 1991

INVENTOR(S) : Kitagawa et al.

It is certified that error appears in the above-identified patent and that said Letters Patent is hereby corrected as shown below:

On the title page:

Item (30), line 1 delete "[U]".

Item (30), line 2 after "63-119754" insert -- [U] --.

Column 8, line 33 for "form" read -- from --.

Signed and Sealed this

Thirteenth Day of April, 1993

Attest:

STEPHEN G. KUNIN

Attesting Officer

Acting Commissioner of Patents and Trademarks